(12) United States Patent
Himmelmann

(10) Patent No.: US 9,091,250 B2
(45) Date of Patent: Jul. 28, 2015

(54) ULTRA HIGH EFFICIENCY LOW FRICTION DRIVE CHAIN FOR WIND TURBINE APPLICATIONS

(75) Inventor: Richard A. Himmelmann, Beloit, WI (US)

(73) Assignee: United Technologies Corporation, Hartford, CT (US)

( * ) Notice: Subject to any disclaimer, the term of this patent is extended or adjusted under 35 U.S.C. 154(b) by 467 days.

(21) Appl. No.: 13/462,222

(22) Filed: May 2, 2012

(65) Prior Publication Data

US 2013/0296087 A1 Nov. 7, 2013

(51) Int. Cl.
*F16G 13/06* (2006.01)
*F03D 11/02* (2006.01)

(52) U.S. Cl.
CPC ............... *F03D 11/02* (2013.01); *F16G 13/06* (2013.01); *F05B 2260/4022* (2013.01); *Y02E 10/722* (2013.01)

(58) Field of Classification Search
CPC ...................................................... F16G 13/06
USPC ........................................ 474/209, 210, 231
See application file for complete search history.

(56) References Cited

U.S. PATENT DOCUMENTS

| | | | |
|---|---|---|---|
| 501,587 A | 7/1893 | Gleason | |
| 569,632 A | 10/1896 | Garrood | |
| 624,492 A | 5/1899 | Hoffman | |
| 2,428,060 A | 9/1947 | Albrecht | |
| 2,655,604 A | 10/1953 | Hütter | |
| 3,278,000 A | 10/1966 | I'Anson | |
| 4,025,724 A | 5/1977 | Davidson, Jr. et al. | |
| 4,334,823 A | 6/1982 | Sharp | |
| 4,423,333 A | 12/1983 | Rossman | |
| 4,653,982 A | 3/1987 | Kojima et al. | |
| 4,729,754 A * | 3/1988 | Thuerman | 474/207 |
| 4,795,408 A | 1/1989 | Kotegawa et al. | |
| 4,915,511 A | 4/1990 | Kotegawa et al. | |
| 5,183,386 A | 2/1993 | Feldman et al. | |
| 5,425,679 A * | 6/1995 | Utz | 474/91 |
| 5,468,376 A * | 11/1995 | Bates | 210/160 |
| 5,562,558 A | 10/1996 | Kubota | |
| 5,806,653 A | 9/1998 | Ahls et al. | |
| 5,823,686 A * | 10/1998 | Murano et al. | 384/492 |
| 6,070,711 A * | 6/2000 | Murano et al. | 198/779 |
| 6,102,573 A * | 8/2000 | Morimoto et al. | 384/127 |
| 6,367,982 B1 | 4/2002 | Doi et al. | |
| 6,465,901 B2 | 10/2002 | Croes | |
| 6,685,588 B2 | 2/2004 | Doi et al. | |

(Continued)

FOREIGN PATENT DOCUMENTS

| | | |
|---|---|---|
| EP | 2221476 A1 | 8/2010 |
| JP | 06102886 | 4/1994 |

*Primary Examiner* — William E Dondero
*Assistant Examiner* — Mark K Buse
(74) *Attorney, Agent, or Firm* — Miller, Matthias Hull LLP

(57) ABSTRACT

A low friction joint apparatus for chain links is provided. The apparatus may include a first link pin rigidly coupled to a first chain link, a second link pin rigidly coupled to a second chain link, a sprocket roller coaxially and pivotally disposed about the second link pin, a plurality of radial bearings radially disposed between the second link pin and each of the first link pin and the sprocket roller, and a plurality of axial bearings axially disposed between the second link pin and the first chain link, and between the sprocket roller and the second chain link. The second link pin may be coaxially and pivotally disposed about the first link pin. The sprocket roller may be rotatable relative to each of the first and second chain links.

18 Claims, 4 Drawing Sheets

(56) References Cited

U.S. PATENT DOCUMENTS

| | | |
|---|---|---|
| 6,742,935 B2 * | 6/2004 | Saji ............................ 384/587 |
| 6,855,080 B2 * | 2/2005 | Kanehira et al. ............ 474/231 |
| 6,979,171 B2 | 12/2005 | Lauritsen |
| 7,198,469 B2 | 4/2007 | Travere |
| 7,276,808 B2 | 10/2007 | Weitkamp et al. |
| 7,296,971 B2 | 11/2007 | Borgen |
| 7,365,447 B2 | 4/2008 | Yoshida |
| 7,612,462 B2 | 11/2009 | Viterna |
| 7,771,158 B2 | 8/2010 | Grassi |
| 7,789,624 B2 | 9/2010 | Appa et al. |
| 7,902,689 B2 | 3/2011 | Kinzie et al. |
| 7,945,350 B2 | 5/2011 | Kinzie et al. |
| 7,956,482 B2 | 6/2011 | Nies et al. |
| 8,663,045 B2 * | 3/2014 | Fujiwara ...................... 474/207 |
| 2002/0110297 A1 * | 8/2002 | Saji ............................ 384/520 |
| 2005/0238489 A1 | 10/2005 | Lund |
| 2008/0196967 A1 | 8/2008 | Breitbach et al. |
| 2008/0298967 A1 | 12/2008 | Matesanz et al. |
| 2009/0097976 A1 | 4/2009 | Driver et al. |
| 2009/0149999 A1 | 6/2009 | Schramm et al. |
| 2009/0223164 A1 | 9/2009 | Cook et al. |
| 2010/0248880 A1 * | 9/2010 | Fujiwara et al. ............. 474/209 |
| 2010/0314884 A1 | 12/2010 | Ollgaard et al. |
| 2011/0058956 A1 | 3/2011 | Zuteck |
| 2011/0135471 A1 | 6/2011 | Wangford |
| 2011/0156393 A1 | 6/2011 | Wakasa et al. |
| 2011/0294616 A1 * | 12/2011 | Fujiwara ...................... 474/207 |

\* cited by examiner

ULTRA HIGH EFFICIENCY LOW FRICTION DRIVE CHAIN FOR WIND TURBINE APPLICATIONS

FIELD OF THE DISCLOSURE

The present disclosure generally relates to wind turbines, and more particularly, relates to low friction drive chains for wind turbine applications.

BACKGROUND OF THE DISCLOSURE

Typical utility-scale wind turbines include a plurality of rotor blades which radially extend from a central rotor hub. The combined assembly of the rotor blades and the rotor hub is generally referred to as the rotor. The rotor blades aerodynamically interact with wind energy, creating lift and drag, which the rotor hub then translates into a driving torque. The driving torque is communicated from the rotor hub through a main shaft that is coupled to the rotor hub. The rotational torque is then distributed to one or more generators via a drivetrain, which in turn produce electric power to be processed and transmitted to an associated electrical grid. The main shaft, the drivetrain and the generators are all situated within a nacelle that is located on top of a tower.

Within the drivetrain, the main shaft communicates any driving torque introduced by wind energy to one or more generators through one or more drive chains. More specifically, rotation of the main shaft causes rotation of one or more drive sprockets rigidly coupled thereto. The drive sprockets rotatably engage the drive chains, which further engage one or more driven sprockets that are rigidly coupled to generator inputs. In wind turbine applications having a plurality of generators that are driven by the single main shaft, multiple sets of drive sprockets and corresponding sets of drive chains are provided on the main shaft where each set of drive sprockets and chains is configured to drive a different generator.

Such drive chains are typically constructed with a plurality of moving components or links, the ends of which are mechanically joined to form a closed loop around the drive and driven sprockets. During use, and as the drive chains are rotated onto and off of the sprockets, the individual links of the drive chains pivot relative to adjacent links, thus abutting and mechanically sliding against one another. Such mechanical interactions between the individual links of the drive chains cause a substantial amount of friction, and thus, significant losses in energy transfer between the main shaft and the associated generators. The energy lost in each drive chain, which may further be compounded in applications employing several sets of drive chains for driving multiple generators, may significantly reduce the overall efficiency of the wind turbine.

Accordingly, it would be beneficial to provide a drive chain which alleviates some of the disadvantages of conventional drive chain assemblies. Specifically, there is a need for a drive chain with links which form joints having smaller areas of contact so as to reduce mechanical interactions therebetween during use. Moreover, there is a need to reduce the amount of overall friction generated within the drive chain so as to increase the efficiency of energy transfer between the main shaft and the generators of a wind turbine.

SUMMARY OF THE DISCLOSURE

In accordance with one aspect of the present disclosure, a low friction joint apparatus for chain links is provided. The apparatus may include a first link pin rigidly coupled to a first chain link, a second link pin rigidly coupled to a second chain link, a sprocket roller coaxially and pivotally disposed about the second link pin, a plurality of radial bearings radially disposed between the second link pin and each of the first link pin and the sprocket roller, and a plurality of axial bearings axially disposed between the second link pin and the first chain link, and between the sprocket roller and the second chain link. The second link pin may be coaxially and pivotally disposed about the first link pin. The sprocket roller may be rotatable relative to each of the first and second chain links.

In accordance with another aspect of the present disclosure, a low friction chain link apparatus for wind turbine applications is provided. The apparatus may include an outer chain link having an outer link pin rigidly coupled to each end thereof, an inner chain link having an inner link pin rigidly coupled to each end thereof, and an inner bearing assembly having inner radial bearings and inner axial bearings. The inner link pin may be coaxially and pivotally coupled about the outer link pin. The inner radial bearings may be radially disposed between the outer link pin and the inner link pin. The inner axial bearings may be axially disposed between the inner link pin and the outer chain link.

In accordance with yet another aspect of the present disclosure, a low friction drive chain for wind turbine applications is provided. The drive chain may include a plurality of outer chain links and inner chain links alternately coupled to form a continuous chain, and a plurality of pivotable joints disposed between the outer and inner chain links. The outer and inner chain links may be sized to receive one or more teeth of at least one sprocket. The pivotable joints may be configured to be movably engaged by rotation of the sprocket. Each joint may have an outer link pin rigidly coupled to the outer chain link, an inner link pin rigidly coupled to the inner chain link and pivotally coupled about the outer link pin, a sprocket roller pivotally coupled about the inner link pin, a plurality of radial bearings radially disposed between the inner link pin and each of the outer link pin and the sprocket roller, and a plurality of axial bearings axially disposed between the inner link pin and the outer chain link, and between the sprocket roller and the inner chain link.

Other advantages and features will be apparent from the following detailed description when read in conjunction with the attached drawings.

BRIEF DESCRIPTION OF THE DRAWINGS

For a more complete understanding of the present disclosure, reference should be made to the embodiments illustrated in greater detail on the accompanying drawings, wherein.

While the following detailed description has been given and will be provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims eventually appended hereto.

DETAILED DESCRIPTION OF THE DISCLOSURE

Figure 1:
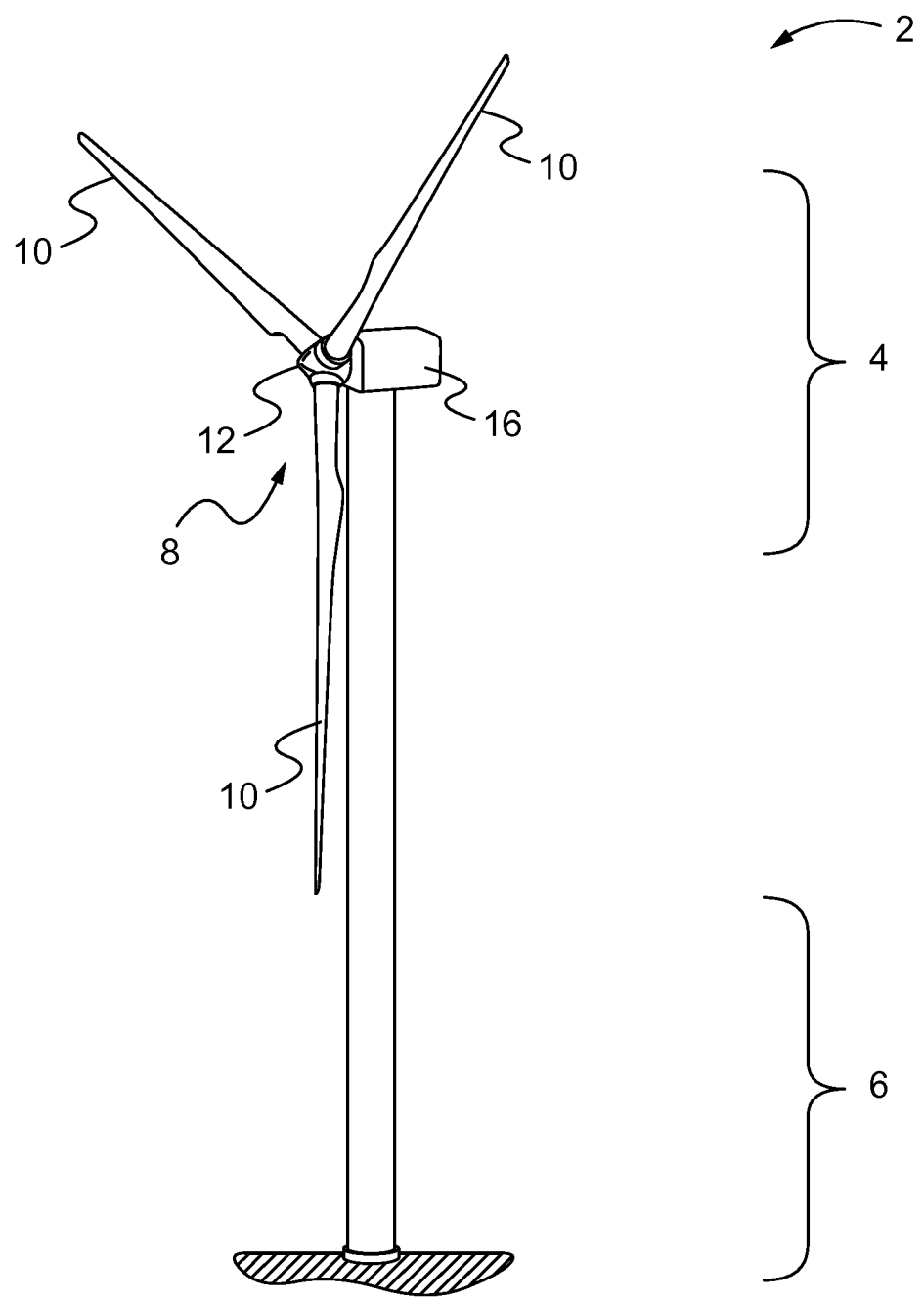
FIG. 1 is a schematic view of a wind turbine, in accordance with at least some embodiments of the present disclosure.
Figure 2:
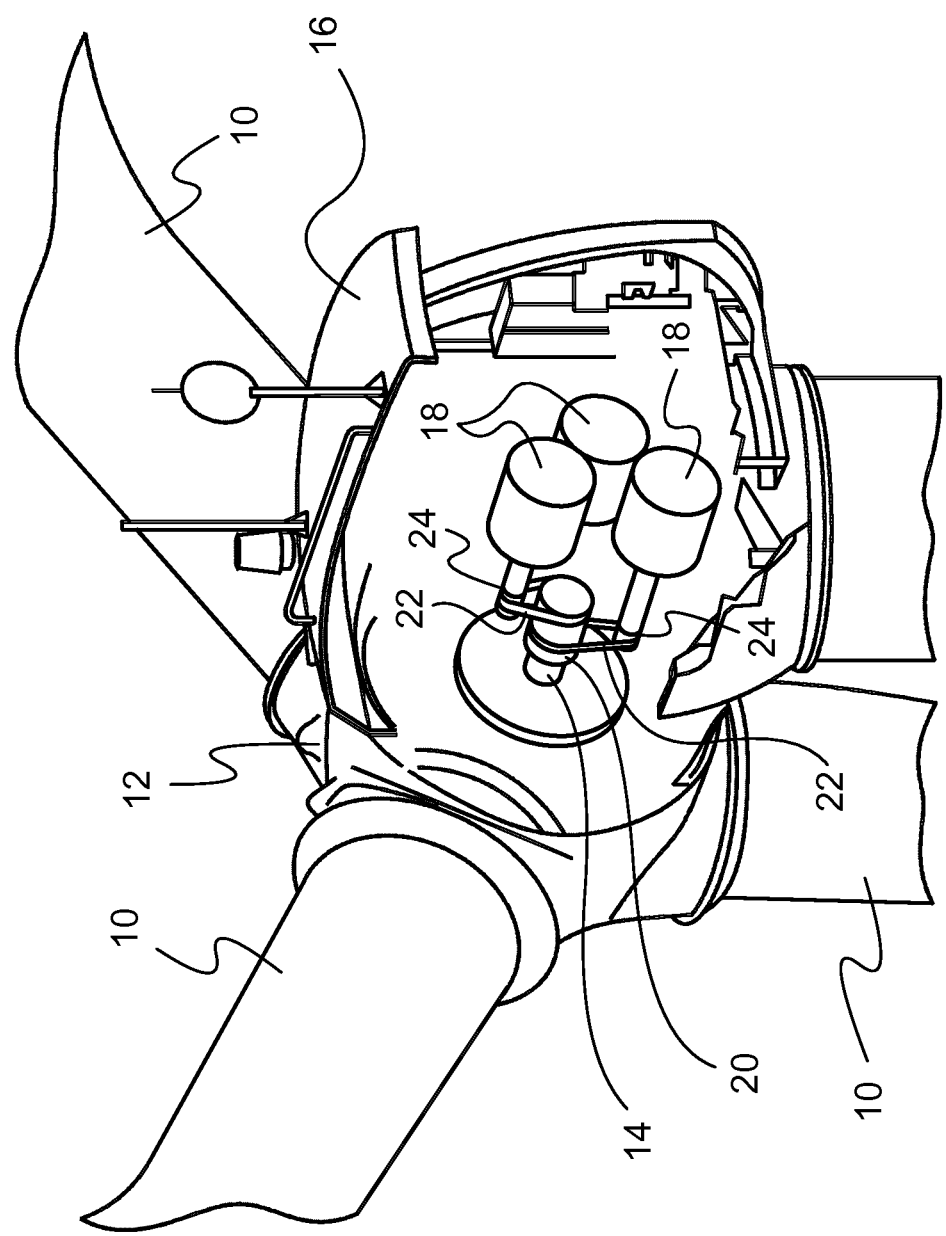
FIG. 2 is a partial perspective view of an uptower section of one exemplary wind turbine.

Referring to FIGS. 1 and 2, an exemplary wind turbine 2 is shown, in accordance with at least some embodiments of the present disclosure. While all the components of the wind turbine have not been shown and/or described, a typical wind turbine 2 may include an uptower section 4 and a downtower section 6. The uptower section 4 may include a rotor 8, which may further include a plurality of blades 10 radially extending from a central hub 12. The blades 10 may rotate with wind energy and the rotor 8 may transfer that energy to a main shaft 14 situated within a nacelle 16, as further illustrated in FIG. 2. The nacelle 16 may provide a drivetrain through which the main shaft 14 may rotatably drive one or more generators 18. In turn, the generators 18 may generate power, which may be transmitted from the uptower section 4 through the downtower section 6 to a power distribution panel (PDP), a pad mount transformer (PMT), and the like, for transmission to an associated electrical grid.

Figure 3:
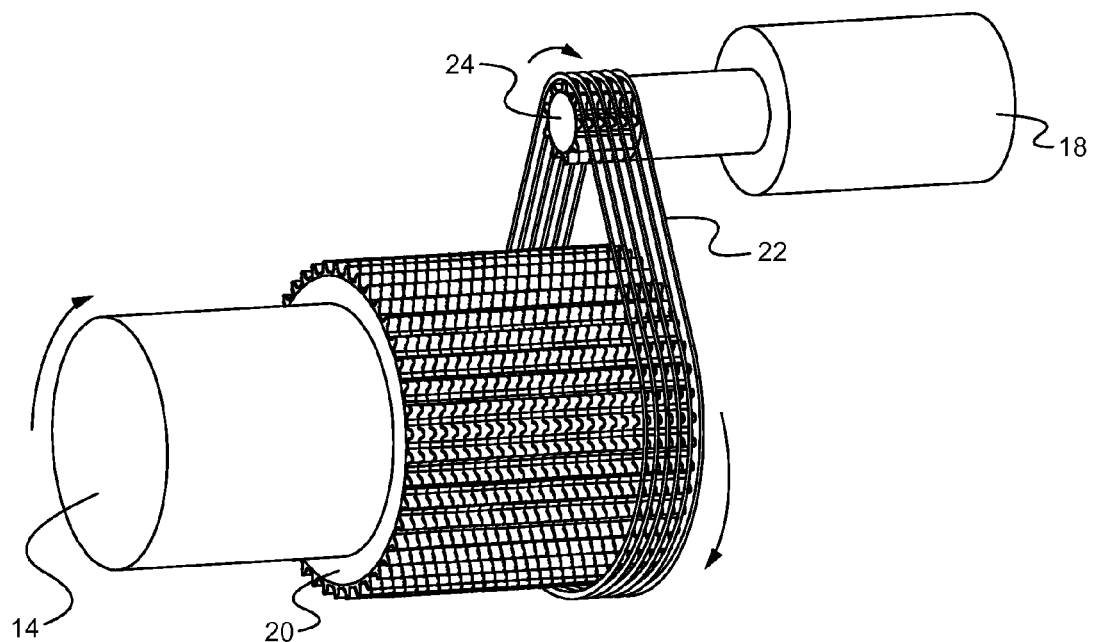
FIG. 3 is a schematic view of a drive sprocket and a driven sprocket being in rotational communication via a plurality of drive chains.

As shown more particularly in FIG. 3, the main shaft 14 of the wind turbine 2 may include one or more drive sprockets 20 having one or more drive chains 22 at least partially engaged therebabout. The drive chains 22 may additionally be at least partially engaged about one or more driven sprockets 24 which may further be coupled to the input of one of the generators 18. As the blades 10 receive wind energy, the rotor 8 and the main shaft 14 may be caused to rotate the drive sprockets 20 as well as the drive chains 22 engaged thereabout. Furthermore, as indicated by the arrows shown in FIG. 3, rotation of the drive chains 22 may also cause the driven sprockets 24 to rotate and generate electrical power via the attached generator 18. As shown, the main shaft 14 may be provided with multiple sets of drive sprockets 20, where each set of drive sprockets 20 serves to drive one of multiple generators 18. For example, four sets of drive sprockets 20 may be employed to drive four different generators 18, where each set of drive sprockets 20 rotatably engages a different set of drive chains 22 and driven sprockets 24 associated with one of the four generators 18. However, it will be understood that other alternative configurations may also be possible. For example, a configuration similar to that shown in FIG. 3 may be employed to drive less than or more than four generators 18. In alternative embodiments, a single drive sprocket 20 may be employed to drive a single generator 18, where a single drive chain 22 is engaged to rotate a single driven sprocket 24 for instance. In still further modifications, the main shaft 14 may be configured to distribute the driving torque first to a plurality of drive sprockets 20 which are not coaxially disposed relative to the main shaft 14 as shown in FIG. 3. Rather, each drive sprocket 20 may be disposed in closer proximity to and in relatively more alignment with its corresponding driven sprocket 24 and generator 18.

Figure 4:
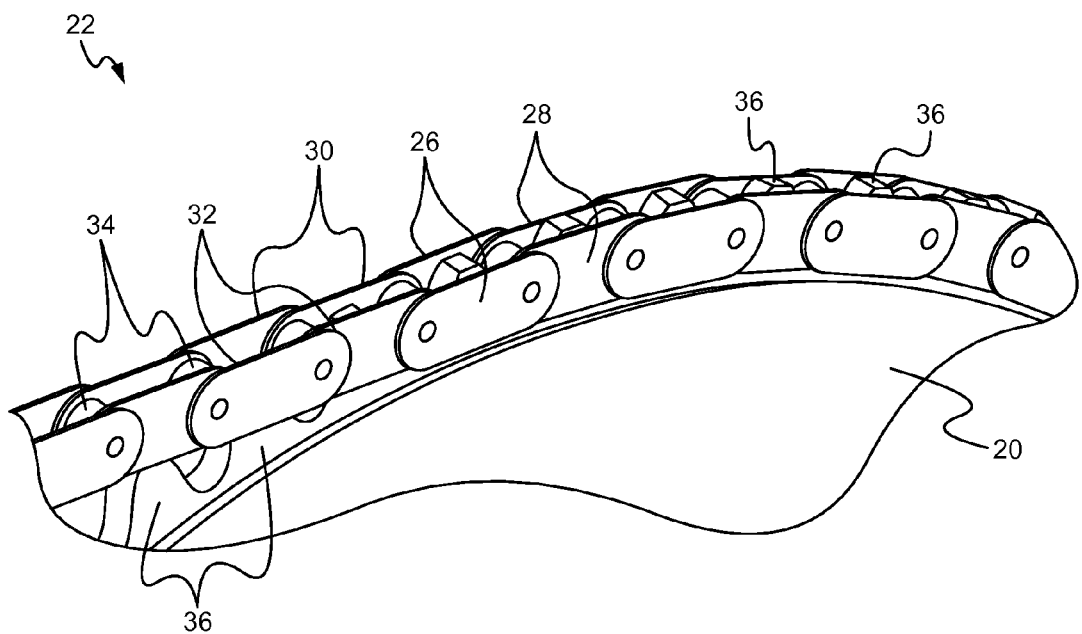
FIG. 4 is a partial perspective view of one exemplary drive chain as provided on a drive sprocket.

Turning to FIG. 4, one exemplary embodiment of a drive chain 22 is shown at least partially engaged about a drive sprocket 20. As shown, the drive chain 22 may generally include a plurality of outer chain links 26 alternately coupled with a plurality of inner chain links 28 to form a plurality of low friction pivotable joints 34 therebetween. Each of the outer and inner chain links 26, 28 may comprise a distal link plate 30 and a proximal link plate 32, where each link plate 30, 32 may be substantially equal in size and shape. The link plates 30, 32 of the inner chain link 28 may differ from those of the outer chain link 26 only in the distance of separation therebetween. More specifically, the link plates 30, 32 of the outer and inner chain links 26, 28 may be sized and configured such that each end of inner chain link 28 is received within the end of an adjacent outer chain link 26 to form each pivotable joint 34. Furthermore, the joints 34 may be sized to sufficiently receive the teeth 36 of the associated drive sprocket 20 therebetween. While each chain link 26, 28 of the drive chain 22 shown in FIG. 4 includes two link plates 30, 32 configured to receive one set of teeth 36, it will be understood that the chain links 26, 28 may similarly be provided with additional distal and/or proximal link plates so as to receive multiple sets of teeth.

Figure 5:
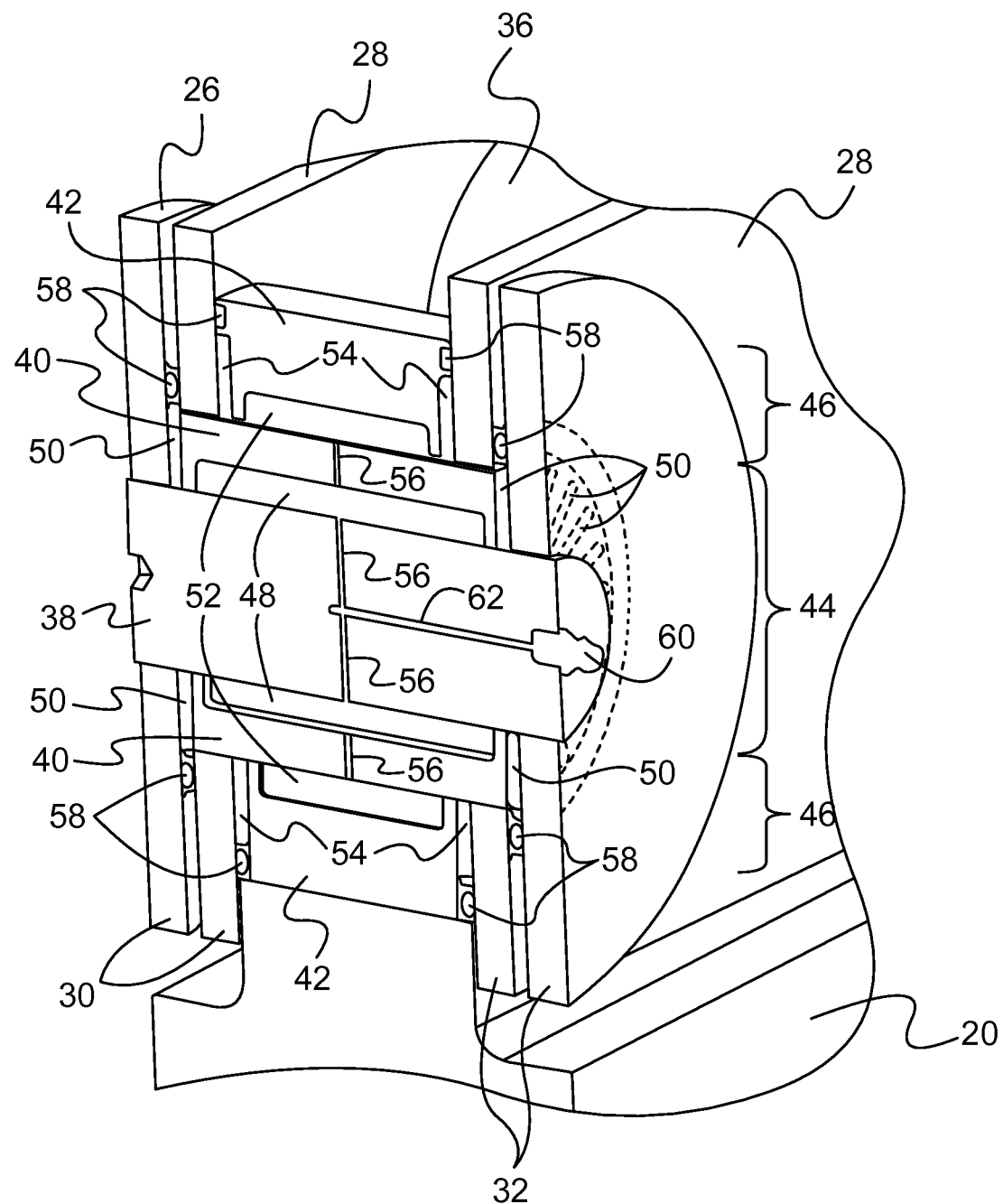
FIG. 5 is a partial perspective view of one exemplary pivotable joint of the drive chain of FIG. 4.

Referring now to FIG. 5, one exemplary embodiment of a low friction joint 34 disposed between the outer chain link 26 and the inner chain link 28 is provided. As shown, the outer chain link 26 may include an outer link pin 38 extending between the distal and proximal link plates 30, 32 and disposed at the ends thereof. Moreover, the outer link pin 38 may be rigidly coupled to the end of the outer chain link 26 so as to be pivotable with the outer chain link 26 and relative to the joint 34 as the drive chain 22 rotates about the drive and driven sprockets 20, 24. Similarly, the inner chain link 28 may include an inner link pin 40 extending between the distal and proximal link plates 30, 32 and disposed at the ends thereof. The inner link pin 40 may be rigidly coupled to the end of the inner chain link 28 so as to be pivotable with the inner chain link 26 and relative to the join 34 as the drive chain 22 rotates about the drive and driven sprockets 20, 24. Furthermore, the inner link pin 40 may be coaxially coupled about the outer link pin 38 and configured to be pivotable relative to the outer link pin 38. The joint 34 may additionally include a sprocket roller 42 that is disposed between the distal and proximal plates 30, 32 of the inner chain link 28 and coaxially coupled about the inner link pin 40. More specifically, the sprocket roller 42 may be rotatable about the inner link pin 40 and configured to abut as well as receive the teeth 36 of the drive or driven sprockets 20, 24.

Still referring to FIG. 5, the pivotable joint 34 may further include an inner bearing assembly 44 as well as an outer bearing assembly 46 configured to substantially reduce the amount of friction between the outer chain links 26, the inner chain links 28 and the sprocket rollers 42. More specifically, the inner bearing assembly 44 may include a plurality of inner axial bearings 48 axially disposed between the outer link pin 38 and the inner link pin 40, as well as a plurality of inner radial bearings 50 radially disposed between the inner link pin 40 and each of the distal and proximal link plates 30, 32 of the outer chain link 26. In particular, each of the inner axial bearings 48 may be disposed within a recess formed in the axial interface between the outer link pin 38 and the inner link pin 40, while each of the inner radial bearings 50 may be disposed within radial recesses formed in the distal and proximal interfaces between the inner link pin 40 and the outer chain link 26. Similarly, the outer bearing assembly 46 may include a plurality of outer axial bearings 52 axially disposed between the inner link pin 40 and the sprocket roller 42, as well as a plurality of outer radial bearings 54 radially disposed between the sprocket roller 42 and each of the distal and proximal link plates 30, 32 of the inner chain link 28. Moreover, each of the outer axial bearings 52 may be disposed within a recess formed in the axial interface between the inner link pin 40 and the sprocket roller 42, while each of the outer radial bearings 54 may be disposed within radial recesses formed in the distal and proximal interfaces between the sprocket roller 42 and the inner chain link 28. Furthermore, each of the inner and outer bearing assemblies 44, 46 may employ ball bearings, roller bearings, needle bearings, tapered bearings, thrust bearings, or any combination thereof.

In additional modifications of the embodiment of FIG. 5, for instance, the bearing assemblies 44, 46 of the pivotable joint 34 may be supplied with an oil, a grease, or any other lubricant suited to further reduce the amount of overall friction that is generated within the joint 34. Correspondingly, a plurality of passages 56 may be internally disposed within the joint 34 so as to receive and promote even distribution of such a lubricant therethrough. For example, one or more radial passages 56 may be centrally disposed within the outer link pin 38 and configured to communicate the lubricant between the inner axial bearings 48. One or more radial passages 56 may also be disposed within the inner link pin 40 and configured to communicate the lubricant between, for example, the inner axial bearings 48 and the outer axial bearings 52. In further modifications, the passages 56 may be arranged in alternative configurations so as to, for example, communicate the lubricant between the inner radial bearings 50 and the outer radial bearings 54.

As shown in FIG. 5, the joint 34 may also include one or more radial grease seals 58 configured to sustain lubrication of the bearing assemblies 44, 46 by preventing contamination and leakage. For instance, the grease seals 58 may be radially fitted between the outer chain link 26 and the inner chain link 28 but external to the inner radial bearings 50 so as to seal the lubricant between the inner link pin 40 and the outer chain link 26. The grease seals 58 may similarly be radially fitted between the sprocket roller 42 and the inner chain link 28 but external to the outer radial bearings 54 so as to seal the lubricant between the sprocket roller 42 and the inner chain link 28. Although the particular embodiment of FIG. 5 is provided with four radially disposed grease seals 58, it will be understood that other configurations may be possible and considered within the scope of the present disclosure. Furthermore, the pivotable joint 34 may be provided with a grease fitting 60 configured to facilitate the addition or insertion of a lubricant into the passages 56. As shown in FIG. 5, for example, the grease fitting 60 may be coaxially disposed at an exterior of the proximal end of the outer link pin 38 for easier access. An insert passage 62 may additionally be provided between the grease fitting 60 and the passages 56 so as to communicate any added lubricant into the bearing assemblies 44, 46. The grease fitting 60 may also be provided with a unidirectional valve, or the like, configured to, for instance, prevent leakage of the lubricant but to allow the insertion of more lubricant therethrough.

Thus, the present disclosure sets forth a drive chain which substantially reduces friction between the main shaft and the generators of wind turbines. The present disclosure provides not only axial bearing assemblies but radial bearing assemblies configured to reduce the areas of contact, and thus, the mechanical resistance, between the individual chain links, link pins, and sprocket rollers of the drive chain. Moreover, the bearings disposed within each chain link joint are configured to serve as thrust bearings so as to further promote true rolling and enable essentially lossless motion. By reducing the amount of friction or mechanical resistance within the drive chain, the present disclosure substantially increases the efficiency of energy transfer between the main shaft and the generators, and thus, increases the overall efficiency of the associated wind turbine.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A low friction joint apparatus for chain links, comprising:
    a first link pin rigidly coupled to a first chain link;
    a second link pin rigidly coupled to a second chain link, the second link pin being coaxially and pivotally disposed about the first link pin;
    a sprocket roller coaxially and pivotally disposed about the second link pin, the sprocket roller being rotatable relative to each of the first and second chain links;
    a plurality of axial bearings disposed between the second link pin and each of the first link pin and the sprocket roller;
    a plurality of radial bearings disposed between the second link pin and the first chain link, and between the sprocket roller and the second chain link; and
    a grease seal disposed between the first chain link and the second chain link.

2. The apparatus of claim 1, wherein an interface between the second link pin and the first link pin forms a recess within which axial bearings are movably disposed.

3. The apparatus of claim 1, wherein an interface between the sprocket roller and the second link pin forms a recess within which axial bearings are movably disposed.

4. The apparatus of claim 1, wherein an interface between the second link pin and the first chain link forms a recess within which radial bearings are movably disposed.

5. The apparatus of claim 1, wherein an interface between the sprocket roller and the second chain link forms a recess within which radial bearings are movably disposed.

6. The apparatus of claim 1, wherein at least one of the first link pin and the second link pin includes passages for carrying a lubricant.

7. The apparatus of claim 1, further comprising a grease seal disposed between the sprocket roller and the second chain link.

8. The apparatus of claim 1, wherein the radial and axial bearings employ any one or more of ball bearings, roller bearings, needle bearings, tapered bearings, and thrust bearings.

9. A low friction chain link apparatus for wind turbine applications, comprising:
    an outer chain link having an outer link pin rigidly coupled to each end thereof;
    an inner chain link having an inner link pin rigidly coupled to each end thereof, the inner link pin being coaxially and pivotally coupled about the outer link pin;
    a sprocket roller coaxially and pivotally disposed about the inner link pin, the sprocket roller being rotatable relative to each of the outer and inner chain links;
    an inner bearing assembly having inner radial bearings and inner axial bearings, the inner axial bearings being disposed between the outer link pin and the inner link pin, the inner radial bearings being disposed between the inner link pin and the outer chain link;
    an outer bearing assembly having outer radial bearings and outer axial bearings, the outer axial bearings being disposed between the sprocket roller and the inner link pin, the outer radial bearings being disposed between the sprocket roller and the inner chain link; and
    a grease seal disposed between the outer chain link and the inner chain link.

10. The apparatus of claim 9, wherein the inner link pin and the outer link pin form a recess therebetween within which the inner axial bearings are movably disposed.

11. The apparatus of claim 9, wherein the inner link pin and the outer chain link form recesses therebetween within which the inner radial bearings are movably disposed.

12. The apparatus of claim 9, wherein the radial and axial bearings employ any one or more of ball bearings, roller bearings, needle bearings, tapered bearings, and thrust bearings.

13. The apparatus of claim 9, wherein at least one of the outer link pin and the inner link pin including passages for carrying a lubricant.

14. A low friction drive chain for wind turbine applications, comprising:
   a plurality of outer chain links and inner chain links alternately coupled to form a continuous chain, the outer and inner chain links being sized to receive one or more teeth of at least one sprocket; and
   a plurality of pivotable joints disposed between the outer and inner chain links and configured to be movably engaged by rotation of the sprocket, each joint having an outer link pin rigidly coupled to the outer chain link, an inner link pin rigidly coupled to the inner chain link and being coaxially and pivotally coupled about the outer link pin, a sprocket roller pivotally coupled about the inner link pin and rotatable relative to the outer and inner chain links, a plurality of axial bearings disposed between the inner link pin and each of the outer link pin and the sprocket roller, a plurality of radial bearings disposed between the inner link pin and the outer chain link, and between the sprocket roller and the inner chain link, and a grease seal disposed between the outer and inner chain links.

15. The drive chain of claim 14, wherein the inner link pin and the outer link pin form a first axial recess therebetween, and the inner link pin and the sprocket roller form a second axial recess therebetween, the axial bearings being movably disposed in each of the first and second axial recesses.

16. The drive chain of claim 14, wherein the inner link pin and the outer chain link form a first set of radial recesses therebetween, and the sprocket roller and the inner chain link form a second set of radial recesses therebetween, the radial bearings being movably disposed in each of the first and second set of radial recesses.

17. The drive chain of claim 14, wherein the radial and axial bearings employ any one or more of ball bearings, roller bearings, needle bearings, tapered bearings, and thrust bearings.

18. The drive chain of claim 14, further comprising a grease seals disposed between the sprocket roller and the inner chain link, and wherein at least one of the outer link pin and the inner link pin including passages for carrying a lubricant.

* * * * *